US008160050B2

(12) United States Patent
Lee

(10) Patent No.: US 8,160,050 B2
(45) Date of Patent: Apr. 17, 2012

(54) MOBILE COMMUNICATION TERMINAL HAVING MULTICASTING FUNCTION AND MULTICASTING METHOD USING THE SAME

(75) Inventor: Baek Ju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 663 days.

(21) Appl. No.: 11/723,921

(22) Filed: Mar. 22, 2007

(65) Prior Publication Data

US 2007/0223488 A1    Sep. 27, 2007

(30) Foreign Application Priority Data

Mar. 23, 2006  (KR) .................. 10-2006-0026644

(51) Int. Cl.
*H04J 3/24* (2006.01)
*H04W 4/00* (2009.01)
*H04W 36/00* (2009.01)

(52) U.S. Cl. ........ 370/349; 370/311; 370/312; 370/331; 370/338; 455/436; 455/437; 455/438; 455/439

(58) Field of Classification Search .................. 370/349, 370/311, 312, 331, 338; 455/436–439
See application file for complete search history.

(56) References Cited

U.S. PATENT DOCUMENTS

| | | | | |
|---|---|---|---|---|
| 7,522,540 | B1 * | 4/2009 | Maufer | 370/254 |
| 2003/0211859 | A1 * | 11/2003 | Chen et al. | 455/518 |
| 2004/0172559 | A1 * | 9/2004 | Luo et al. | 713/201 |
| 2005/0091313 | A1 * | 4/2005 | Zhou et al. | 709/204 |
| 2006/0050659 | A1 * | 3/2006 | Corson et al. | 370/310 |
| 2006/0146730 | A1 * | 7/2006 | Zeng et al. | 370/254 |

OTHER PUBLICATIONS

Fenner, Internet Group Management Protocol, Version 2, Network Working Group, Nov. 1997, pp. 1-24.*
Bae et al., Multicast Protocol Implementation and Validation in an Ad hoc Network Testbed, IEEE icc2001, vol. 10, Jun. 11, 2001, pp. 3196-3200, http: //www.cs.ucla.edu/NRL/wireless.

* cited by examiner

*Primary Examiner* — Un C Cho
*Assistant Examiner* — Jing Gao
(74) *Attorney, Agent, or Firm* — Birch, Stewart, Kolasch & Birch, LLP

(57) ABSTRACT

A mobile communication terminal and multicasting method using the same are disclosed, by which an inter-multiuser multicasting function can be performed without using an access point. The present invention includes a user interface unit, a multicast group management module managing subscriber information based on information delivered via the interface unit, the multicast group management module playing a role in generating and transferring a multicast packet, an internet multicast protocol module delivering a message for joining or leaving a specific group according to a control signal provided by the multicast group management module, and a wireless LAN driving unit performing a multicast traffic action of transmitting the message provided by the internet multicast protocol module in a packet format to a joining group terminal by an ad-hoc system and delivering a packet received from a group terminal to the internet multicast protocol module.

2 Claims, 5 Drawing Sheets

MOBILE COMMUNICATION TERMINAL HAVING MULTICASTING FUNCTION AND MULTICASTING METHOD USING THE SAME

This application claims the benefit of the Korean Patent Application No. 10-2006-0026644, filed on Mar. 23, 2006, which is hereby incorporated by reference as if fully set forth herein.

BACKGROUND OF THE INVENTION

1. Field of the Invention

The present invention relates to a mobile communication terminal, and more particularly, to a mobile communication terminal and multicasting method thereof. Although the present invention is suitable for a wide scope of applications, it is particularly suitable for performing multicasting by configuring a group with a plurality of terminal users using Ad-hoc network failing to employ an access point (AP) in a terminal provided with a wireless LAN.

2. Discussion of the Related Art

Generally, data communications between terminals can be classified into a wire communication system and a wireless communication system. And, the wireless communication systems can be classified into infrared communication system, blue-tooth system, radio frequency system and the like. Moreover, the wireless communication system is achieved by one-to-one communications.

In order to meet the contemporary demands raised by the mobile communication terminal users increased by geometric progression, an apparatus and method are needed to implement a multicasting function of transceiving multicast packets between a plurality of mobile communication terminals.

SUMMARY OF THE INVENTION

Accordingly, the present invention is directed to a mobile communication terminal having an inter-multiuser multicasting function and inter-multiuser multicasting method using the same that substantially obviate one or more problems due to limitations and disadvantages of the related art.

An object of the present invention is to provide a mobile communication terminal and multicasting method using the same, by which an inter-multiuser multicasting function can be performed without using an access point.

Another object of the present invention is to provide a mobile communication terminal and multicasting method using the same, by which a multicasting function can be performed with a plurality of group members using an internet group multicast protocol.

Another object of the present invention is to provide a mobile communication terminal and multicasting method using the same, by which a variety of multimedia data can be simultaneously transferred using a multicast group.

A mobile communication terminal according to the present invention is characterized in combining different layer techniques including WLAN independent basic service set (IBSS) and application layer multicasting.

In particular, the mobile communication terminal is provided with an ad-hoc network join function and an internet group multicast protocol (IGMP).

The mobile communication terminal according to the present invention is characterized in that an interface unit delivers a control signal to a multicast group management module to perform a group join, a group leave and an environment configuration according to a signal provided by a user.

The mobile communication terminal according to the present invention is characterized in that an interface unit displays a user status of a currently joining or managed group via a display device.

A multicasting method according to the present invention is characterized in performing inter-multiuser communications using an internet group multicast protocol in a plurality of mobile communication terminals connected by an ad-hoc system not employing an access point.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for inter-multiuser using a terminal according to the present invention includes the step of performing inter-multiuser communications with a plurality of group members by an ad-hoc system using a mobile communication terminal having an internet group multicast protocol (IGMP) function.

In another aspect of the present invention, a method for inter-multiuser using a terminal includes the steps of performing an ad-hoc join using a WLAN (wireless local area network), performing a procedure for joining an arbitrary group by an internet group multicast protocol (IGMP) system, performing a multicasting communication by the IGMP system, performing a procedure for leaving the joined group, and releasing the ad-hoc join.

In another aspect of the present invention, a method for inter-multiuser using a terminal includes a multicasting join procedure (A) including a step (a-1) of transmitting an ad-hoc join packet to a terminal group having a same session ID, a step (a-2) of receiving an ad-hoc response packet from the terminal group having the same session ID, a step (a-3) of transmitting a multicast query packet including a group IP to join and a user name to the terminal group having the same session ID, and a step (a-4) of receiving a group join success packet from the terminal group having the same session ID and a multicasting release procedure (B) including a step (b-1) of transmitting a user name and a multicast leave packet including a group IP joined by a mobile communication terminal attempting to leave a joined multicast group, a step (b-2) of receiving a multicast leave success message (IGMP leave message), a step (b-3) of transmitting an ad-hoc release request packet (ad-hoc leave packet) to the terminal group having the same session ID, and a step (b-4) of receiving an ad-hoc leave complete message and displaying the received ad-hoc leave complete message to be recognized by a user.

In another aspect of the present invention, a mobile communication terminal having a inter-multiuser multicasting function includes a user interface unit, a multicast group management module managing subscriber information based on information delivered via the interface unit, the multicast group management module playing a role in generating and transferring a multicast packet, an internet multicast protocol module delivering a message for joining or leaving a specific group according to a control signal provided by the multicast group management module, and a wireless LAN driving unit performing a multicast traffic action of transmitting the message provided by the internet multicast protocol module in a packet format to a joining group terminal by an ad-hoc system and delivering a packet received from a group terminal to the internet multicast protocol module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the object of the present invention is to apply ad-hoc and group multicasting technique, which differ from each other in concept, to a mobile communication terminal. So, a terminal should be provided with a wireless LAN (WLAN) function. And, there should exist an internet group multicast protocol (hereinafter abbreviated IGMP) as a higher protocol.

Figure 1:
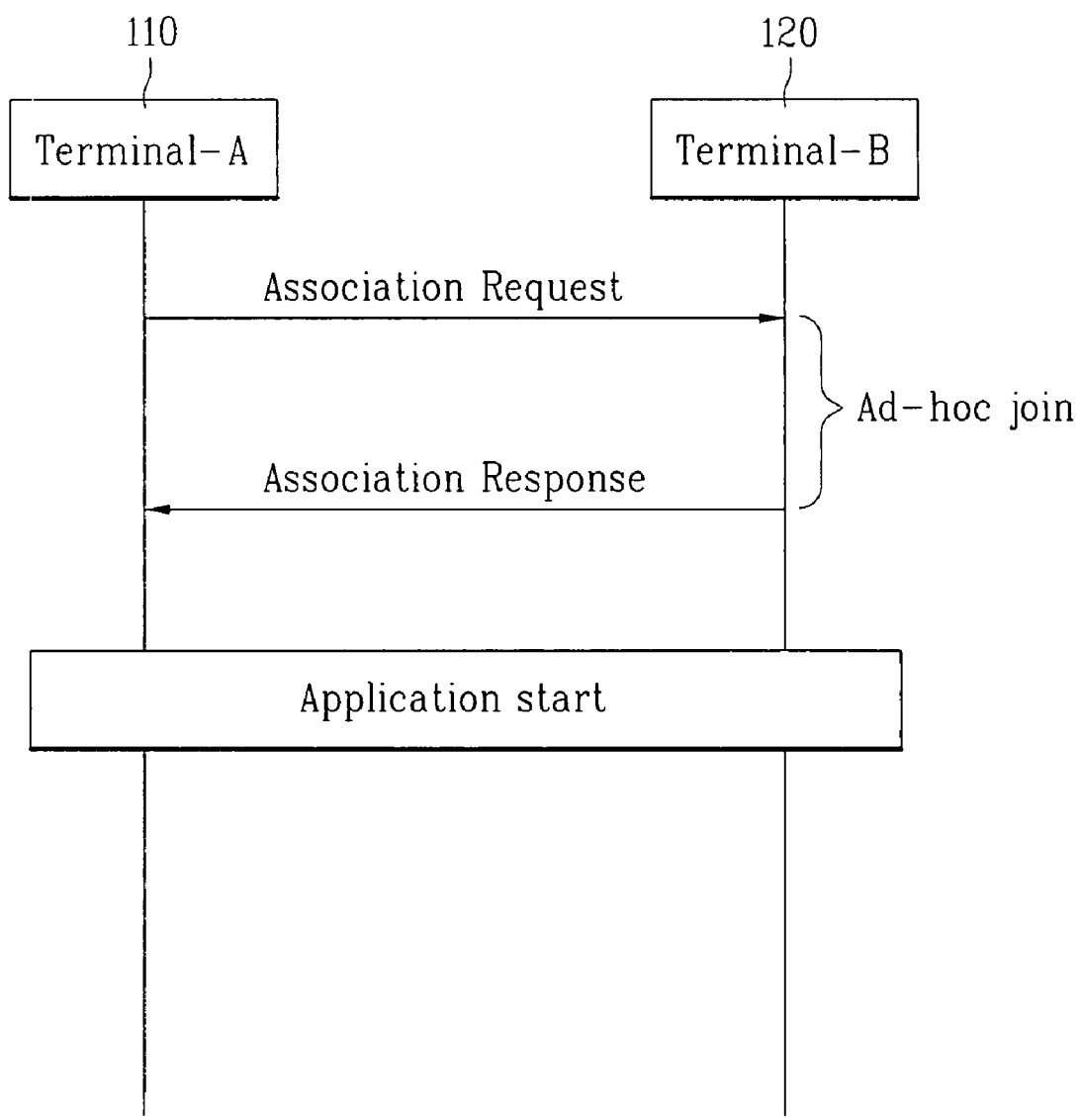
FIG. 1 is a flowchart to schematically explain a concept of ad-hoc applicable to the present invention.

FIG. 1 is a flowchart to schematically explain a concept of ad-hoc applicable to the present invention.

Referring to FIG. 1, an ad-hoc network means a network that operates by peer-to-peer without passing through an access point (AP).

A terminal-A 110 attempts to make an access transmits an association request message containing a session ID and channel information on a radio link. In response to the association request message, another terminal-B 120 transmits an association response message to the terminal-A. Hence, an ad-hoc link is established between the two terminals 110 and 120.

In delivering data provided by a service provider to a terminal via a router, there exist two kinds of systems, i.e., a unicast system and a multicast system.

Figure 2A:
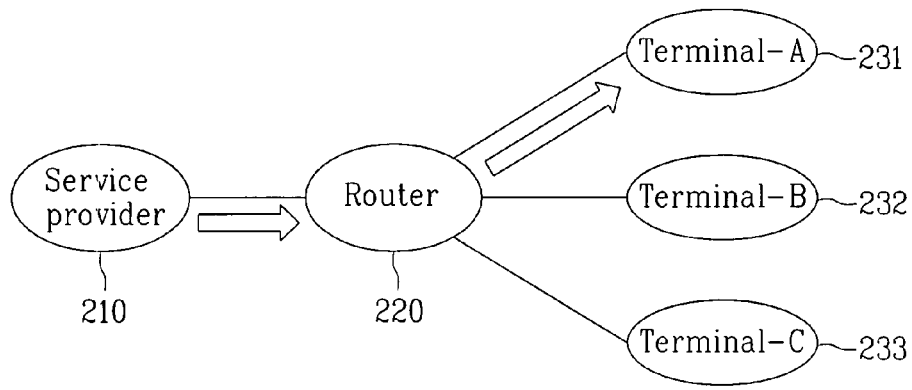
FIGS. 2A to 2C are schematic diagrams to explain a unicast concept.
Figure 2B:
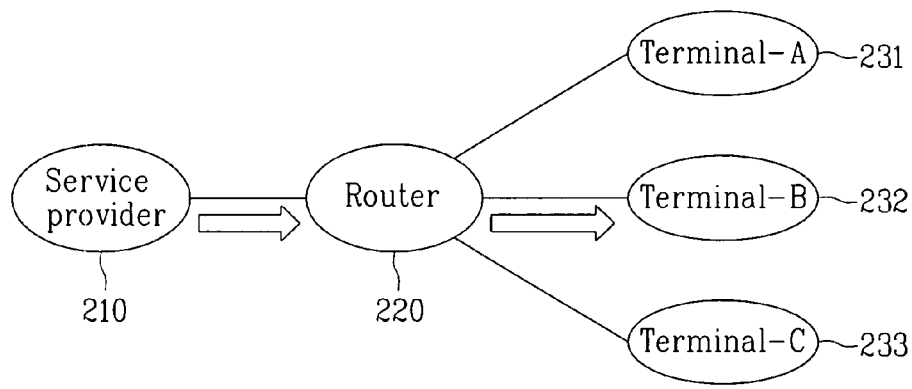
Figure 2C:
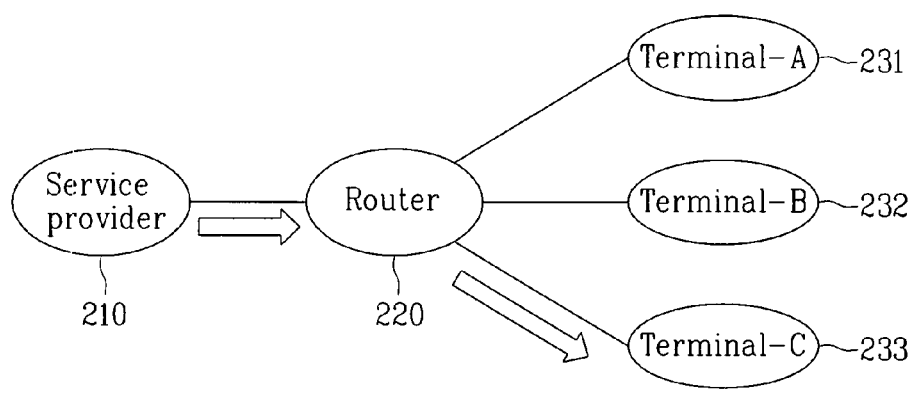

FIGS. 2A to 2C are schematic diagrams to explain a unicast concept, which indicate that a router 220 is not provided with a multicast function.

Referring to FIGS. 2A to 2C, a service provider 210 transmits data to a router 220.

Since the router 220 is incapable of performing a multicast function, the data provided by the service provider 210 is delivered to each of a plurality of terminals 231, 232 and 233. In this case, a same job is repeatedly carried out between the service provider 210 and the router 220. Such a repetitive job works as an unnecessary load for a network. So, a network speed is lowered.

Figure 3:
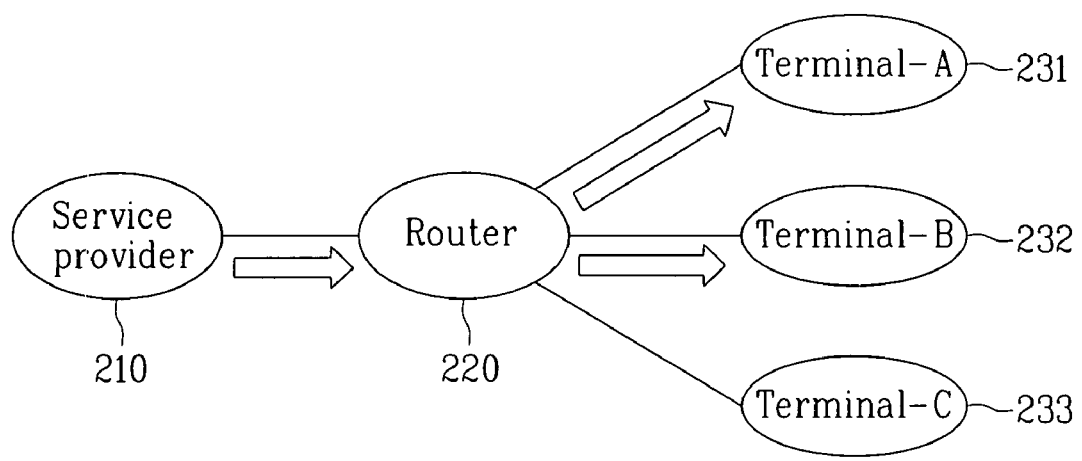
FIG. 3 is an exemplary diagram to explain a concept of multicast applicable to the present invention.

Meanwhile, if a router is provided with a multicast function, data is processed in a manner shown in FIG. 3.

FIG. 3 is an exemplary diagram to explain a concept of multicast applicable to the present invention.

Referring to FIG. 3, a service provider 210 transmits data to a router 220 once only. The router 220 delivers the data to specific terminals 231 and 232 by a unicast system. Data is not received from the service provider 210 every time. So, it is able to avoid the unnecessary load of repeating a same operation in a network.

Figure 4:
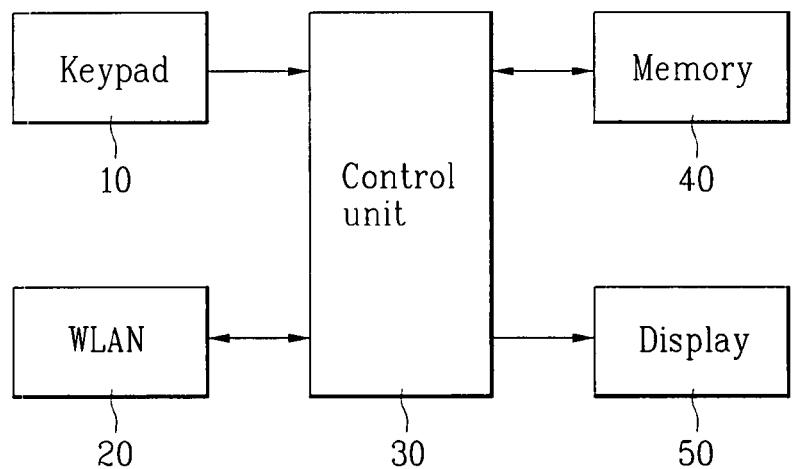
FIG. 4 is a schematic block diagram of a mobile communication terminal according to the present invention.

FIG. 4 is a schematic block diagram of a mobile communication terminal according to the present invention.

Referring to FIG. 4, a mobile communication terminal according to the present invention includes a keypad 10 outputting an electrical signal corresponding to a user's input, a control unit 30 outputting a control signal corresponding to the electrical signal provided by the keypad 10, a wireless LAN 20 playing a role as an interface for a data exchange with a different terminal by an ad-hoc system not employing an access point according to the control signal outputted by the control unit 30, a memory storing group information according to a multitask implementation with the different terminal, joined terminal information and the like, and a display 50 outputting information in a format recognizable by a terminal user according to the control signal of the control unit 30.

Figure 5:
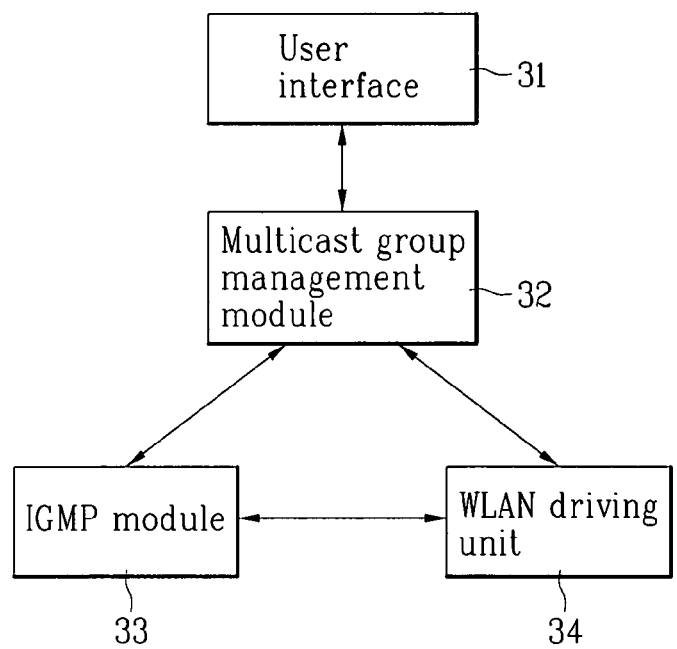
FIG. 5 is an exemplary diagram of elements required for implementing an inter-multiuser multicasting function according to the present invention.

FIG. 5 is an exemplary diagram of elements required for implementing an inter-multiuser multicasting function according to the present invention.

Referring to FIG. 5, the elements required for implementing an inter-multiuser multicasting function according to the present invention include an interface unit 31 performing interfacing with a terminal user, a multicast group management module 32 managing subscriber information based on information delivered via the interface unit 31, the multicast group management module 32 playing a role in generating and transferring a multicast packet, an internet group multicast protocol module 33 controlling a specific group join or leave, the internet group multicast protocol (IGMP) module 33 performing a client function and a server function simultaneously, and a WLAN driving unit 34 controlling a WLAN access of an ad-hoc system not employing an access point, the WLAN driving unit 34 transceiving multicast traffics.

Meanwhile, IGMP is a protocol to provide a specific service to a terminal joining a specific multicast group only and manage its. In a general concept, there exists an IGMP server that manages entire groups. And, there should exist an IGMP client attempting to join a specific group.

An IGMP server is a router or switch on a network, and an IGMP client generally includes a host or terminal. In the present invention, each terminal attempting to join a group becomes both a client and a server. This is because the IGMP module 33 exists in each terminal together with a wireless LAN capable of implementing an ad-hoc system.

Functions of the above-explained elements are explained as follows.

First of all, the user interface 31 plays a role as an interface with a user. The information, which is processed by a terminal based on a signal inputted by a keypad, is outputted via a display device. For this case, menus including 'join multicast', 'leave multicast', 'configuration', 'status' and the like are used. This is just exemplary for the explanation of the present invention and can be further modified in various ways according to the applications of the present invention, which is apparent to those skilled in the art.

First of all, the 'join multicast' menu is a menu used in case of attempting to join a specific multicast group. An input value includes a session ID of a wireless LAN, a user name and group IP addresses.

The 'leave multicast' menu is used in case of leaving a joined multicast group. An input value includes a session ID and a group IP address.

The 'configuration' menu is to set up a profile of a wireless LAN. It is able to edit a session ID for join or a channel to use. If a group ID address and multicast traffic do not exist, it is able to set up a timer capable of stopping multicast automatically.

And, the 'status' menu enables a user to see a user name of a group that is currently joined or managed. And, a user currently connected or disconnected is also able to see the user name.

The multicast group management module 32 sets up a wireless LAN according to information delivered by the user interface 31. The multicast group management module 32 activates a multicast group protocol. The multicast group management module 32 plays a role in managing information for subscribers or delivering multicast traffics to a higher application. And, the multicast group management module 32 generates a multicast packet and then transfers it to an IP layer.

The internet group multicast protocol module 33 is a protocol to manage a multicast group. The internet group multicast protocol module 33 controls a specific group join or leave. The internet group multicast protocol module 33 manages a multicast group. And, the internet group multicast protocol module 33 simultaneously performs both a multicast server function and a client function.

The WLAN driving unit 34 plays a role in driving a WLAN device. The WLAN driving unit 34 manages an access status of WLAN, a radio link state management, multicast traffic transmission/reception and a multicast address.

Figure 6:
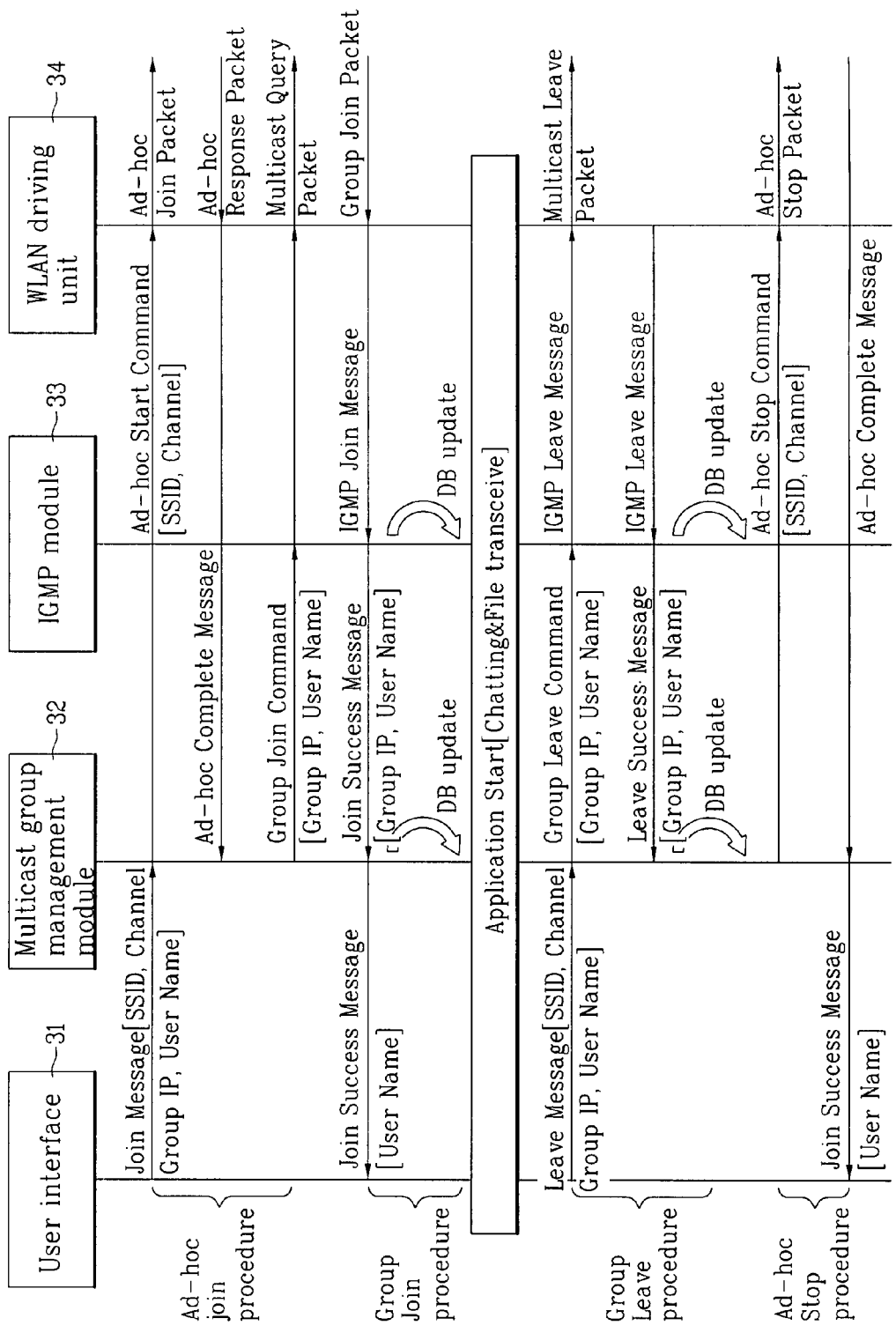
FIG. 6 is an exemplary flowchart to explain inter-element signal transfer and its operational relations to implement an inter-multiuser multicasting function according to the present invention.

FIG. 6 is an exemplary flowchart to explain inter-element signal transfer and its operational relations to implement an inter-multiuser multicasting function according to the present invention.

Referring to FIG. 6, an add-hoc join procedure is carried out using input information of a user attempting to join a specific multicast group. A join message includes a session ID, channel information, an IP address of a group and a user name.

The user interface unit 31 delivers the join message to the multicast management module 32. The multicast management module 32 delivers an add-hoc start command to the WLAN driving unit 34. In this case, the ad-hoc start command includes a session ID and channel information. The WLAN driving unit 34 transmits an ad-hoc join packet to a group terminal having the same session ID. The WLAN driving unit 34 receives an ad-hoc response packet from a terminal attempting to join a group. In this case, the terminal has the same session ID. The WLAN driving unit 34 transmits an ad-hoc complete message to the multicast management module 32. Hence, the ad-hoc join procedure is completed.

After completion of the ad-hoc join, the multicast management module 32 transfers a group join command to the IGMP module 33. In this case, the group join command includes a group IP address and a user name. The IGMP module 33 transfers an IGMP query message to the WLAN driving unit 34. The WLAN driving unit 34 transmits a multicast query packet to the terminal of the group having the same session ID. The WLAN driving unit 34 receives a group join packet. The WLAN driving unit 34 transfers an IGMP join message to the IGMP module 33. The IGMP module 33 transfers a join success message to the multicast management module 32. In this case, the join success message includes a group IP address and a user name. The multicast management module 32 delivers the join success message to the user interface 31. Thus, the group join procedure is completed. And, a group list and per group member information within the terminal are stored in a memory provided to the terminal.

As mentioned in the foregoing description, an inter-terminal multitasking environment is configured by the ad-hoc system without passing through an access point. In this mode, a plurality of terminals exchange multimedia with each other or perform a multi-cast operation such as a multi-user conversation and the like.

In the aforesaid multitasking environment, an automatic leave is achieved after a prescribed time if a specific terminal moves away from an ad-hoc zone. In general, the ad-hoc zone ranges 100 m in an open site or 50 m in an office room or the like. Even if a terminal is turned off, the automatic: leave is achieved. And, a corresponding confirmation is performed by a periodic check.

The leave from a multicasting group is executed in a manner reverse to that of the join procedure.

First of all, a procedure for leaving a group is preferentially executed. The use interface unit 31 delivers a leave message to the multicast management module 32. In this case, the leave message includes a session ID, channel information, a group IP address and a user name. The multicast management module 32 transfers a group leave command to the IGMP module 33. In this case, the group leave command includes a group IP address and user name information. The IGMP module 33 transfers an IGMP leave message to the WLAN driving unit 34. The WLAN driving unit 34 transmits a multicast leave packet to a terminal having the same session ID and then notifies the corresponding transmission to the IGMP module 33. So, the IGMP module 33 sends a leave success message, which indicates that the group leave has been normally completed, to the multicast management module 32. In this case, the leave success message includes a group IP address and user name information. And, this fact is reflected on a memory. Thus, the group leave procedure is completed.

Subsequently, an ad-hoc stop procedure is executed.

First of all, the multicast management module 32 transfers an ad-hoc stop command to the WLAN driving unit 34. In this case, the ad-hoc stop command includes a session ID and channel information. The WLAN driving unit 34 transmits an ad-hoc stop packet and then transmits an ad-hoc complete message to the multicast management module 32. The multicast management module 32 informs the user interface unit 31 that the ad-hoc stop has been successfully performed. Thus, the ad-hoc stop procedure is completed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for inter-multiuser multicasting using a specific terminal including a multicast group management module, an Internet Group Multicast Protocol (IMGP) module, a wireless local area network (WLAN) driving unit and a memory storing a terminal group list and per group member, comprising:
    an ad-hoc join procedure (A) comprising:
        a step (a-1) of delivering an ad-hoc start message including a session ID and channel information from the multicast group management module to the WLAN driving unit;
        a step (a-2) of transmitting an ad-hoc join packet to a terminal group having a same session ID among terminal groups in the terminal group list at the WLAN driving unit;
        a step (a-3) of receiving an ad-hoc response packet from at least one terminal included in the terminal group having the same session ID at the WLAN driving unit, wherein the at least one terminal includes the IMGP module and the WLAN driving unit; and
        a step (a-4) of delivering an ad-hoc complete message from the WLAN driving unit to the multicast group management module; and
    a group join procedure (B) comprising:
        a step (b-1) of delivering a group join command including a group IP address and a user name from the multicast group management module to the IMGP module;
        a step (b-2) of transferring a IGMP query message from the IMGP module to the WLAN driving unit;
        a step (b-3) of transmitting a multicast query packet to the at least one terminal included in the terminal group having the same session ID at the WLAN driving unit;
        a step (b-4) of receiving a group join success packet from the at least one terminal included in the terminal group having the same session ID at the WLAN driving unit;
        a step (b-5) of transferring a IGMP join message from the WLAN driving unit to the IMGP module;
        a step (b-6) of delivering a join success message from the IMGP module to the multicast group management module;
        a step (b-7) of adding the user name into the group member of the terminal group having the same session ID; and
        a step (b-8) of performing a multi-cast operation with the at least one terminal included in the terminal group having the same session ID,
        wherein each terminal included in the terminal group having the same session ID becomes both a IMGP client and a IMGP server.

2. An inter-multiuser multicasting capable communication terminal, comprising:
    a user interface unit;
    a multicast group management module configured to manage subscriber information based on information delivered via the interface unit;
    an Internet Group Multicast Protocol (IGMP) module configured to deliver a message for joining or leaving a specific terminal group according to a control signal provided by the multicast group management module; and
    a wireless local area network (WLAN) driving unit configured to perform a multicast traffic action of transmitting the message provided by the IGMP module in a packet format to the specific terminal group by an ad-hoc system and deliver a packet received from the specific terminal group to the IGMP module; and
    a memory configured to store a terminal group list and per group member,
    wherein the multicast group management module is further configured to deliver an ad-hoc start message including a session ID and channel information to the WLAN driving unit,
    wherein the WLAN driving unit is further configured to transmit an ad-hoc join packet to a terminal group having a same session ID among terminal groups in the terminal group list, receive an ad-hoc response packet from at least one terminal included in the terminal group having the same session ID, and deliver an ad-hoc complete message to the multicast group management module, wherein the at least one terminal includes the IMGP module and the WLAN driving unit,
    wherein the multicast group management module is further configured to deliver a group join command including a group IP address and a user name from to the IMGP module,
    wherein the IMGP module is further configured to transfer a IGMP query message to the WLAN driving unit,
    wherein the WLAN driving unit is further configured to
        transmit a multicast query packet to terminals included in the terminal group having the same session ID,
        receive a group join packet from terminals included in the terminal group having the same session ID, and
        transfer a IGMP join message to the IMGP module,
    wherein the IMGP module is further configured to deliver a join success message to the multicast group management module,
    wherein the multicast group management module is further configured to add the user name into the group member of the terminal group having the same session ID and perform a multi-cast operation with terminals included in the terminal group having the same session ID, and
    wherein each terminal included in the terminal group having the same session ID becomes both a IMGP client and a IMGP server.

\* \* \* \* \*